United States Patent
Lee

(10) Patent No.: US 6,182,676 B1
(45) Date of Patent: Feb. 6, 2001

(54) PROTECTOR FOR SEWER CLEANING HOSE

(76) Inventor: David Lee, 16350 SW. 282 St., Homestead, FL (US) 33033-1043

(*) Notice: Under 35 U.S.C. 154(b), the term of this patent shall be extended for 0 days.

(21) Appl. No.: 09/259,457

(22) Filed: Mar. 1, 1999

(51) Int. Cl.[7] .................................................. B08B 9/04
(52) U.S. Cl. ..................................... 134/167 C; 138/96 R
(58) Field of Search ........................... 134/167 C, 168 C; 138/96 R, 96 T, 110

(56) References Cited

U.S. PATENT DOCUMENTS

| | | | |
|---|---|---|---|
| 1,785,985 | * 12/1930 | Shrum | 138/96 T |
| 2,022,189 | * 11/1935 | Engstrom | 138/96 R |
| 2,128,650 | 8/1938 | Knoerzer . | |
| 2,143,480 | * 1/1939 | Gundermann | 138/96 T |
| 2,225,615 | * 12/1940 | Bay | 138/96 R X |
| 3,347,526 | 10/1967 | Cymmer et al. . | |
| 3,522,815 | * 8/1970 | Prange | 134/167 C X |
| 4,071,919 | * 2/1978 | Fields et al. | 134/167 C X |
| 4,156,487 | 5/1979 | Dowd et al. . | |
| 4,260,119 | 4/1981 | Price . | |
| 4,476,603 | 10/1984 | Lukaszewicz . | |
| 4,732,397 | 3/1988 | Gavin . | |
| 5,090,079 | 2/1992 | Allison et al. . | |

FOREIGN PATENT DOCUMENTS

| | | | |
|---|---|---|---|
| 556113 | * 8/1932 | (DE) | 138/96 R |
| 3038704 | * 7/1982 | (DE) | 134/167 C |

* cited by examiner

Primary Examiner—Philip R. Coe
(74) Attorney, Agent, or Firm—Pearne & Gordon LLP

(57) ABSTRACT

A protector for protecting a cleaning hose inserted into an end of a generally cylindrical sewer pipe and withdrawn therefrom during cleaning with contact against an end of the sewer pipe includes a body having a generally cylindrical insert portion dimensioned to be received in the end of the sewer pipe and a flange portion. The flange has a radial width, relative to a central axis of the pipe, greater than a wall thickness of the pipe. A back surface of the flange portion is held against an end surface of the pipe, thereby retaining the protector in position to prevent the hose from scraping against the pipe end and being damaged. The protector is preferably permanently installed on the pipe.

8 Claims, 3 Drawing Sheets

PROTECTOR FOR SEWER CLEANING HOSE

FIELD OF THE INVENTION

This invention relates to sewer cleaning apparatus and, more specifically, to a device for protecting hose which is used in the sewer cleaning process.

BACKGROUND OF THE INVENTION

Sanitary sewer pipes are generally installed underground so that they extend nearly horizontally at a depth of, typically, three feet or more below the surface which may be a hard-surfaced street or simply beneath the ground. Because of the waste material which is carried by such pipes and because of the incursion of roots and the like, it is necessary to run a cleaning tool through a sewer pipe from time to time. A truck specially equipped with a large-volume water tank, a high-pressure water pump and a length of high-pressure hose, is used. A nozzle designed to propel the hose through the pipe is attached to the hose. The hose is unrolled from a reel on the truck through an open manhole and the nozzle end is inserted into an open end of the sewer pipe. Water under pressure is then applied to the hose and the nozzle is propelled through the pipe, carrying the hose with it as the hose unreels from the truck, to the next manhole which may be 250 to 400 feet away. The reel is then driven in the opposite direction to reel in the hose while water under pressure is passed through the hose, accomplishing the desired cleaning.

While this system works well, a disadvantage is that the hose rubs against the edge of the open end of the sewer pipe. This edge can be sharp and rough and causes considerable wear of the hose, which is commonly rubber-covered. Such hoses are quite expensive and need to be replaced frequently at significant cost. In an effort to reduce this cost, rubber sleeves or rigid guides have been developed. The intent is that such devices are lowered into the manhole around the hose to protect against this damage, but they are heavy and/or very cumbersome with the result that they are not used, leaving the hoses unprotected.

SUMMARY OF THE INVENTION

Briefly described, the invention comprises a protector for protecting a cleaning hose inserted into an end of a generally cylindrical sewer pipe and withdrawn therefrom during cleaning with contact against an end of the sewer pipe, the protector comprising a body having a generally cylindrical insert portion dimensioned to be received in the end of the sewer pipe and a flange portion. The flange has a radial width, relative to a central axis of the pipe, greater than a wall thickness of the pipe. Fastener means holds a back surface of said flange portion against an end surface of the pipe.

BRIEF DESCRIPTION OF THE DRAWINGS

In order to impart full understanding of the manner in which the advantages and features of the invention are attained in accordance with the invention, particularly advantageous embodiments thereof will be described with reference to the following drawings, which form a part of this disclosure, and wherein.

DESCRIPTION OF PREFERRED EMBODIMENTS

Figure 1:
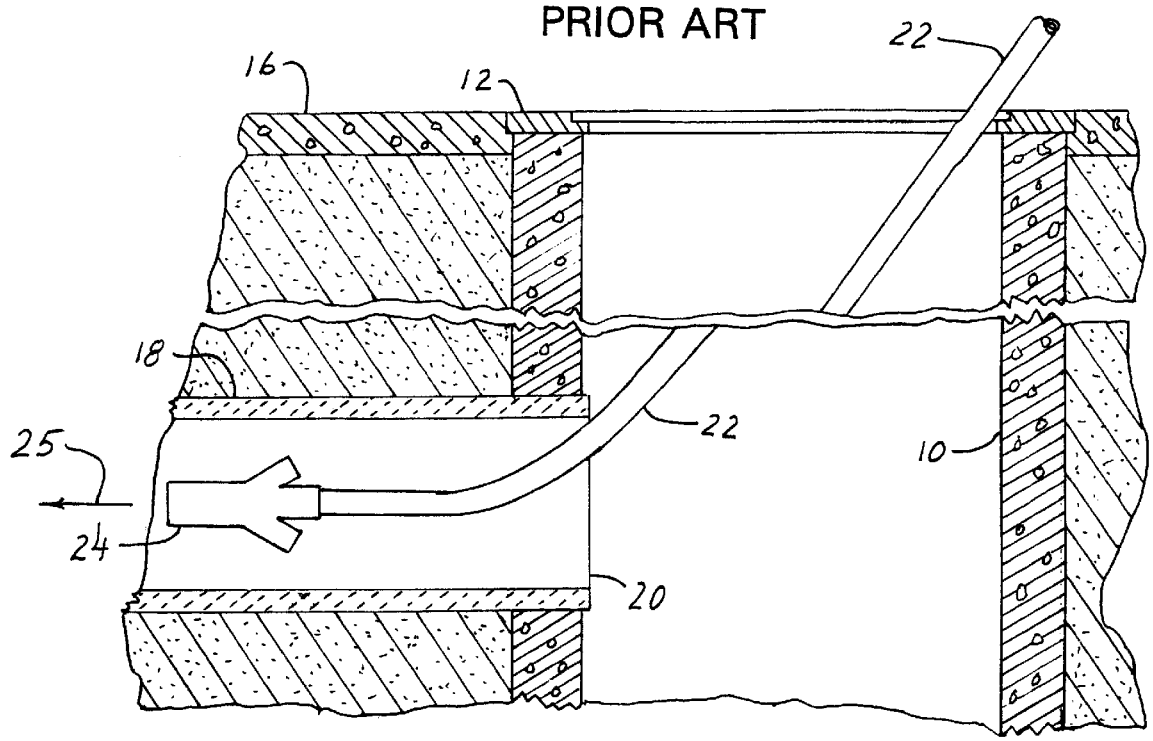
FIG. 1 is a schematic and simplified foreshortened sectional view of a typical sanitary sewer pipe installation in the earth.

As shown in FIG. 1, a typical sanitary sewer installation includes a generally vertical access pipe 10 having a support ring 12 at its upper end which normally holds a manhole cover 14, shown partly removed in dash-dot lines, to limit access to the sewer. The support ring and manhole cover are normally approximately flush with an upper surface of a surrounding street or other surface material 16. A generally horizontal sanitary sewer pipe 18 lies beneath the surface of the earth a distance of three feet or more and has an open end 20 which protrudes through an opening in a side of pipe 10. Sewer pipe 18 is typically about 8 inches in inside diameter and, in good engineering practice, has a slight slope adequate to maintain flow of liquid therethrough in a desired direction to limit the growth of bacteria and the like in the pipe.

As mentioned above, when cleaning is necessary, manhole cover 14 is removed and a hose 22, connected to a reel on a cleaning truck (not shown), is passed down the access pipe and into the sewer pipe with a special nozzle 24 at the end of the hose which is inserted into the sewer pipe. Water under considerable pressure is then caused to flow into the hose and the nozzle propels the hose through the sewer pipe, as discussed above, in the direction of arrow 25. The nozzle is allowed to travel a desired distance, e.g., several hundred feet., with the reel allowed to turn freely so that the hose is payed out along the sewer line.

When the nozzle has traveled the desired distance, the reel on the truck is used to retrieve the hose while water under pressure is forced through the hose and forcibly ejected from nozzle outlets 26, impinging on and cleaning the interior of the pipe. During this retrieval, the hose is pulled upwardly and scrapes against the open end 20 of pipe 18, causing wear of the hose. As will be seen from FIG. 1, regardless of the angle of extraction of the hose from the access pipe opening, the hose scrapes the open end of the sewer pipe, causing considerable and irreparable damage to the hose, largely because of the hardness of the material of the pipe, generally a vitreous material, and because the pipe end is often sharp and rough.

Figure 2:
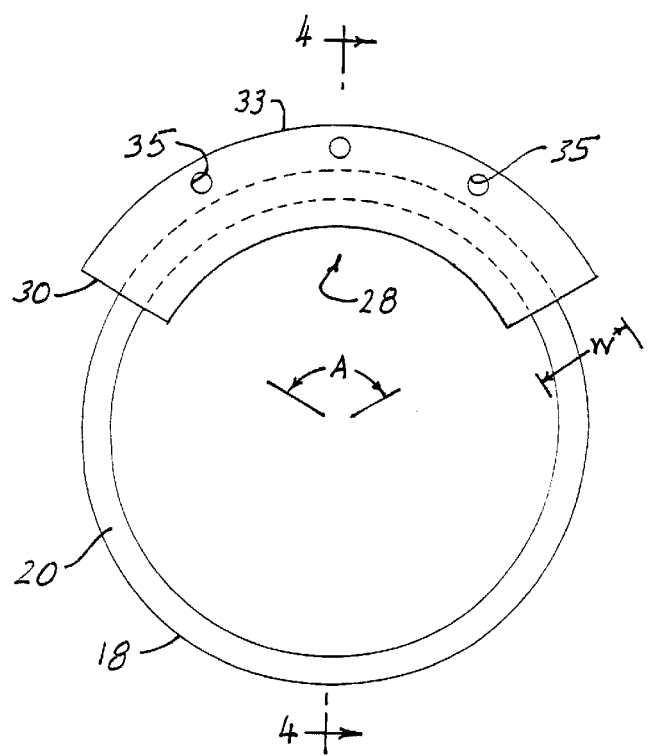
FIG. 2 is an end elevation of a sewer pipe with a first embodiment of a hose protector in accordance with the invention mounted thereon.
Figure 3:
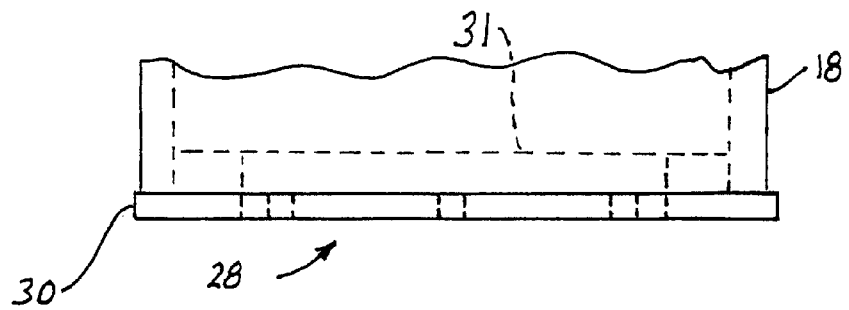
FIG. 3 is a top plan view of the pipe and protector of FIG. 2.

FIG. 2 shows an end view of sewer pipe 18 with a first embodiment of a hose protector indicated generally at 28 in accordance with the invention attached thereto. As seen in FIG. 2, and also in FIGS. 3 and 4, hose protector 28 comprises an arcuate flange 30 and a cylindrical pipe insert 31. Insert 31 has an outer surface shaped and dimensioned to approximately fit within pipe 18 which, typically, has an inner diameter of about 8 inches. Flange 30 has a front surface which faces inwardly toward the interior of access pipe 10 and a back surface which abuts the open end 20 of pipe 18. The flange and insert occupy an angle A of about 120° of arc and are mounted at the uppermost part of sewer pipe 18 so that they cover end 20 of the pipe over about 60° on either side of the top of the pipe.

Flange 30 has a radial width W which is greater than the combined radial dimensions of insert 31 and the thickness of the pipe wall so that a lip 33 protrudes radially beyond the outer surface of pipe 18. Lip 33 is penetrated by a plurality of holes 35 for receiving fasteners such as lag bolt 37, shown in FIG. 4, which is threaded into the wall of access pipe 10 to keep protector 28 in the desired position. For an 8 inch pipe, thickness W can be about 1.5 inches and the axial thickness of lip 33 is about 0.5 inch. The entire axial length of the protector need be only about 1.5 inches.

Flange 30 and insert 31 are preferably made of a material such as a moldable polymer which has a hardness about the same as, or less than, the hardness of the exterior of the hose to be used for cleaning as described above. The hardness can also be greater than that of the hose, but will be less than that of pipe 18. In addition, the outer surface of flange 30 is preferably made smooth and slightly rounded so that the hose can ride across the protector without significant friction and without abrasion. The protector can advantageously be molded in a single piece if it is made of plastic, but it will be recognized that it can also, for example, be made of wood, formed in two pieces, joined by fasteners and adhesive and rounded to present a smooth contact surface to the hose.

Figure 4:
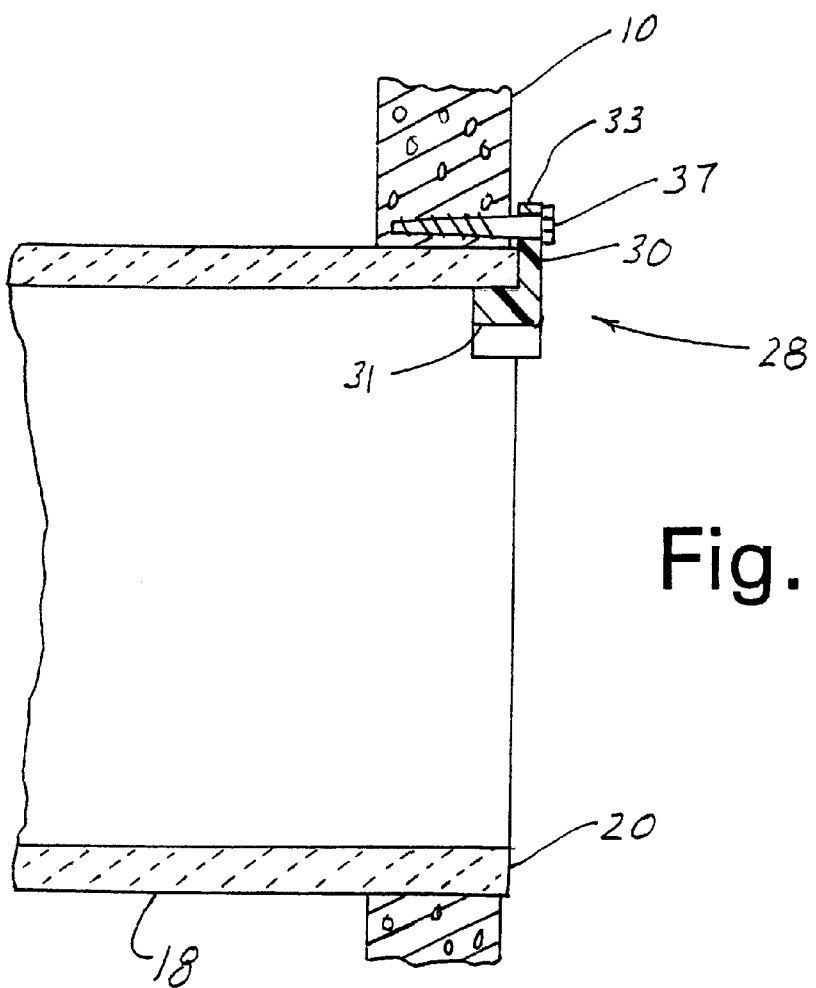
FIG. 4 is a side elevation, in section along line 4—4 of FIG. 2, of the pipe and protector of FIGS. 1 and 2.
Figure 5:
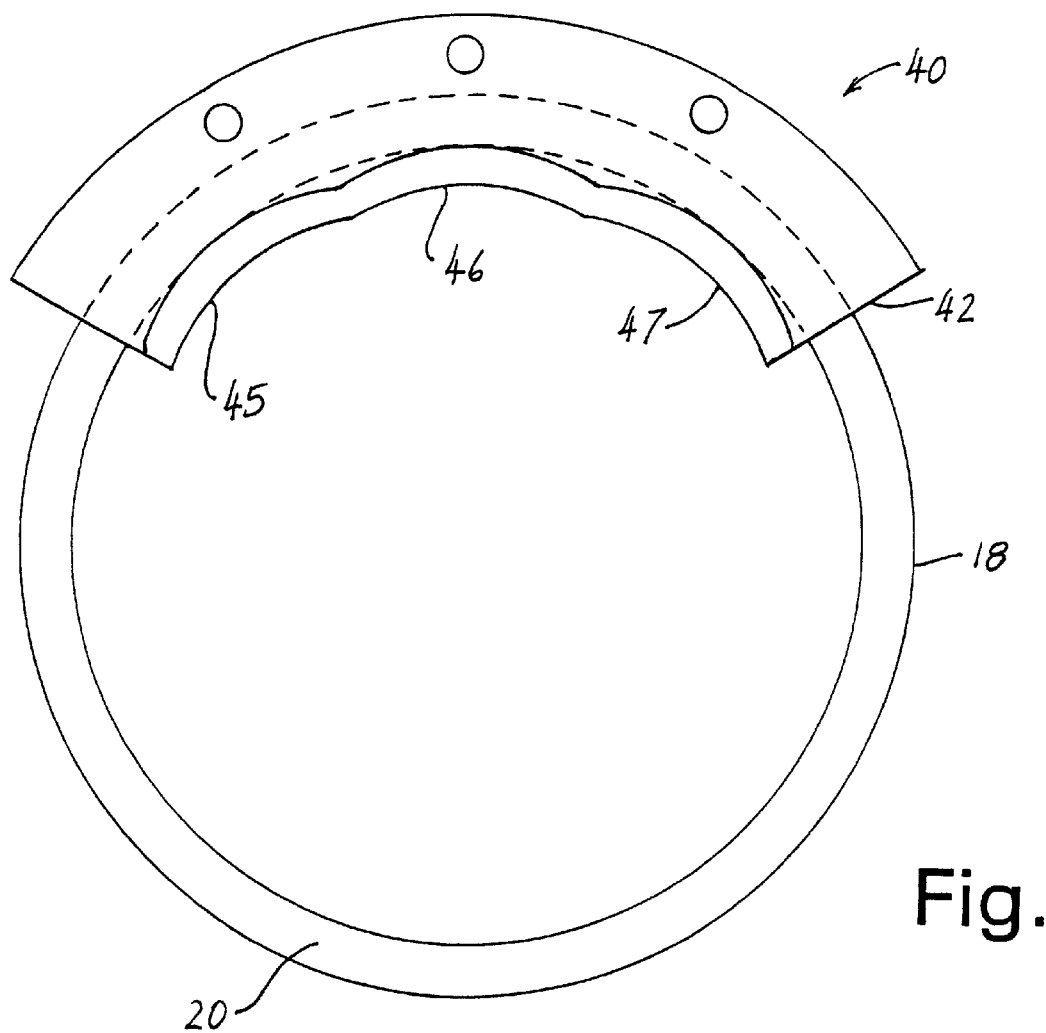
FIG. 5 is an end elevation of a sewer pipe with a second embodiment of a hose protector in accordance with the invention mounted thereon.
Figure 6:
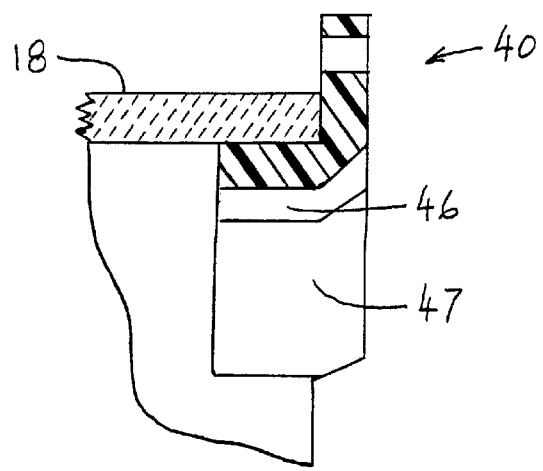
FIG. 6 is a partial sectional view along line 6—6 of FIG. 5.

A further embodiment of a hose protector 40 in accordance with the invention is shown in FIGS. 5 and 6 and comprises a flange 42 and an insert 43. The embodiment of FIG. 5 is the same as that of FIGS. 2–4 except that the contact surface of the flange and insert, i.e., the corner at which the flange and insert join and which is contacted by the hose during cleaning, is formed with a plurality of individual radii 45, 46 and 47 forming a scalloped surface which performs a guiding function for the hose. Once the hose enters one of the scalloped regions, it tends to remain therein rather than slipping to the side.

As will be seen in FIGS. 2 and 4, the first embodiment of the hose protector has an insert with a single inside radius which is smaller than the inside radius of pipe 18. In the embodiment of FIGS. 5 and 6, the three scallops each have a radius which is still smaller, i.e., the centers of curvature of the three scallops lie on a circle which is between the central axis of pipe 18 and the inner surface of the pipe. The radius can be chosen to provide a curvature which approximately matches the outer diameter of the cleaning hose to be used.

It will be recognized that a specific installation could exist in which end 20 of the sewer pipe protrudes so far beyond a adjacent surface such as the inner surface of access hole 10 that mounting in the manner described above is not practical. In this case, it is possible to mount a ring around the end of the sewer pipe so that it occupies the position of wall 10 as shown in FIG. 4. The ring can comprise two semi-circular halves joined by a circumferential band or any convenient mounting device so that threaded fasteners can penetrate lip 33 and the added ring in the manner shown in FIG. 4.

While certain advantageous embodiments have been chosen to illustrate the invention, it will be understood by those skilled in the art that various modifications can be made therein without departing from the scope of the invention as defined in the appended claims.

What is claimed is:

1. A protector for protecting a cleaning hose inserted into an end of a generally cylindrical sewer pipe and withdrawn therefrom during cleaning with contact against an end of the sewer pipe, the sewer pipe end being generally circular and having a top portion and a bottom portion, the protector comprising:

a body, said body having an insert portion and a flange portion that extends radially from said insert portion, said insert portion being dimensioned to be received in said top portion of said sewer pipe end and extending in an arc that occupies less than 360°;

said flange portion having a radial width, relative to a central axis of said pipe, greater than a wall thickness of said pipe; and means for holding a back surface of said flange portion against an end surface of said pipe.

2. A protector according to claim 1 wherein said means for holding said back surface against said end surface comprises a plurality of openings through said flange portion and a plurality of fasteners extending through said openings and threadedly engaging a surface adjacent, but radially spaced from, said pipe end.

3. A protector according to claim 1 wherein said insert portion comprises a radially inner surface having a plurality of scallops each having a radius less than the inside radius of said pipe and each being centered on a circle between said inner surface of said pipe and a central axis of said pipe.

4. A protector according to claim 1, wherein said body extends in an arc and occupies less than 360°.

5. A protector according to claim 4, wherein said arc-shaped body occupies less than 180°.

6. A protector according to claim 4, wherein said arc-shaped body occupies 120°.

7. A protector according to claim 1, wherein said arc-shaped insert portion occupies less than 180°.

8. A protector according to claim 1, wherein said arc-shaped insert portion occupies 120°.

* * * * *